(12) United States Patent
Ikegami (10) Patent No.: US 6,510,104 B1
(45) Date of Patent: Jan. 21, 2003

(54) ACOUSTIC FREQUENCY SELECTION IN ACOUSTIC LOGGING TOOLS

(75) Inventor: Toru Ikegami, Machida (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 119 days.

(21) Appl. No.: 09/589,021

(22) Filed: Jun. 7, 2000

(51) Int. Cl.$^7$ ................................................. G01V 1/00
(52) U.S. Cl. ........................................ 367/31; 181/102
(58) Field of Search ............................ 367/31, 25, 27, 367/28, 32, 35, 49, 57, 86; 181/102, 105, 106; 702/6, 14, 18

(56) References Cited

U.S. PATENT DOCUMENTS 5,587,966 A 12/1996 Kimball et al. ............... 367/31

FOREIGN PATENT DOCUMENTS

WO      WO97/28464      8/1997

OTHER PUBLICATIONS

Schmitt D P et al: "Shear Wave Logging in Semi–Infinite Saturated Porous Formations" Journal of the Acoustical Society of America, American Institute of Physics, New York, US, vol. 84, No. 6 Index, Dec. 1 1988, pp. 2230–2244.

Paillet F L et al: "A numerical investigation of head waves and leaky modes in fluid–filled boroholds" Geophysics, Jul. 1986, 7SA, vol. 51, No. 7, pp. 1438–1449.

Schmitt D P et al: "Shear Wave Logging in Semi–Finite Saturated Porous Formations" Journal of the Acoustical Society of America, American Institute of Physics, New York, U.S. vol. 84, No. 6 Index, Dec. 1, 1988, pp. 2230–2244.*

* cited by examiner

Primary Examiner—Edward Lefkowitz
Assistant Examiner—Anthony Gutierrez
(74) Attorney, Agent, or Firm—Robin Nava; Victor Segura; Brigitte Jeffery (57) ABSTRACT

A logging system has a sonde in a borehole, which transmits sonic waves with one or more dipole sources to optimally excite dipole flexural mode sonic waves in the borehole. The system first determines the Airy frequency of the borehole. Then, the dipole sources are fired at a dipole firing frequency selected based on the Airy frequency.

20 Claims, 7 Drawing Sheets

PWF2: Nkarika_z01.dlis: So=520, Sx=180,
E=-69%, QC=6, Fa=2.78, Fx=6.60 R=0.42

FIG. 6

PWF2: Nkarika_z02.dlis: So=530, Sx=560,
E=6%, QC=4, Fa=0.80, Fx=1.06 R=0.75

FIG. 7

UDP_1:Qilioso_z01.dlis#1:So=132, Sx=200,
E=52%, QC=1, Fa=6.50, Fx=3.09 R=2.10

FIG. 8

UDP_1:Qilioso_z03.dlis#3:So=106, Sx=100,
E=-6%, QC=1, Fa=13.00, Fx=3.92 R=3.32

ACOUSTIC FREQUENCY SELECTION IN ACOUSTIC LOGGING TOOLS

BACKGROUND OF THE INVENTION

1. Field of the Invention

The present invention relates to methods for characterizing physical properties of underground formations by transmitting sonic waves in the borehole and by processing resulting sonic waveform measurements and, in particular, to methods for selecting the acoustic frequency of transmitted sonic waves to optimally excite dipole flexural mode sonic waves in the borehole.

2. Description of the Related Art

In the development of natural hydrocarbon (e.g. oil) reservoirs, a borehole is typically drilled into the ground from a surface location. Downhole measurements of various phenomenon and properties are often made to determine various characteristics related to the underground resources or formations, or otherwise related to the drilling process. To make such measurements, various borehole sensors or detectors may be located in the drill bit, in the bottom hole (or borehole) assembly (BHA), in the drill string above the mud motor, or in any other part of the sub-surface drill string. Borehole sensors are often contained on a special tool, such as a wireline tool, which is lowered into the hole on a wireline cable. The downhole measuring tool may also contain various signal sources for generating signals in the borehole for detection by sensors in the tool after passing through the borehole and/or underground formations around the borehole.

The sensed or measured data is typically transmitted to the surface, where it can be stored, processed, or otherwise used, e.g. to monitor and control the drilling process. Data measured or sensed by the downhole tool is typically transmitted or telemetered back to receivers and processing equipment at the surface by various telemetry techniques and systems, such as by hard wired cables or wireline tools which contain electrical and/or fiber optic conductors which transmit data to the surface based on inductive coupling or other principles.

Telemetry techniques other than wireline telemetry are also sometimes used to transmit sensed data to the surface. MWD (measurements-while-drilling) and LWD (logging-while-drilling) techniques, for example, which are sometimes used for making downhole measurements, typically employ drilling fluid or mud pulse telemetry, electromagnetic telemetry, or acoustic telemetry through the drill string itself, to transmit sensed data to the surface. Acoustic borehole telemetry and related modulation schemes are described by S. P. Monroe, "Applying Digital Data-Encoding Techniques to Mud Pulse Telemetry," *Proceedings of the 5th-SPE Petroleum Computer Conference*, Denver, Jun. 25th–28th, 1990, SPE 20236, pp. 7–16.

It is possible to determine properties of underground formations using measurements of acoustic/sonic waves that have passed through the formations. Thus, one type of measurement made downhole is measurement of sonic waves generated by a sonic generator or transmitter, which sonic waves have passed through the borehole and/or underground formations. Sonic or acoustic logging tools are accordingly utilized during various phases of hydrocarbon development and exploration.

For example, a sonic logging tool may be lowered by a logging cable into an open borehole. Such a tool, sometimes referred to as a sonde, typically contains one or more sonic wave generators or sources (transmitters), and one or more sonic wave receivers (typically hydrophones), separated by a known distance on the tool. The sonic logging tool emits or "fires" sonic waves, typically in the form of pulses, in accordance with an excitation or drive voltage waveform applied to the transducer of the sonic wave source. These transmitted sonic waves pass through the formation around the borehole and are then detected at the receiver(s). The detected acoustic signals are then typically transmitted to the surface, via a wireline inside the logging cable, for example, for processing, storage, monitoring, or other purposes. In addition to open-hole measurements, a sonic logging tool may also be used to make cased-hole measurements.

Sonic waves can travel through rock formations in essentially two forms: body waves and surface waves. There are two types of body waves that travel in rock: compressional and shear. Compressional waves, or P-waves, are waves of compression and expansion and are created when the rock formation through which the sonic waves travel is sharply compressed. With compressional waves, small particle vibrations occur in the same direction the wave is traveling. Shear waves, or S-waves, are waves of shearing action as would occur when a body is struck from the side. In this case, rock particle motion is perpendicular to the direction of wave propagation.

Surface waves are found in a borehole environment as complicated borehole-guided waves which come from reflections of the source waves reverberating in the borehole. The most common form of borehole-guided surface wave is the Stoneley (St) wave. Such sonic waveforms may be detected by a receiver as a result of sonic waves generated or emitted from a monopole (omnidirectional, or symmetric) source, for example. A monopole source generates primarily an axisymmetric family of modes together with compressional and shear headwaves.

Dipole (directional sources and receivers may also be used in some applications. A dipole source excites the flexural family of borehole modes together with compressional and shear headwaves. The flexural mode waves may be referred to as flexural waves. Sonic waves will also travel through the fluid in the borehole and along the tool itself. With no interaction with the formation, these waves carry no useful information and can interfere with the waveforms of interest if they have similar propagation speeds.

A dipole transmitter may consist essentially of a moving coil loudspeaker capable of radiating pressure pulses from both sides of its "speaker-cone." The speaker-cone is typically a piezoelectric source or disk such as a 2" diameter titanium disk. Thus, when a current pulse (having a drive or excitation waveform) passes through the coil, the disk vibrates parallel to its axis, creating positive pressure on the borehole fluid on one side of the sonde, and a negative pressure on the other side. Thus, when dipole sources are employed, an additional shear/flexural wave propagates along the borehole and is caused by the flexing action of the borehole in response to the dipole signal from the source. The receivers may be hydrophone receivers, placed on the tool along the borehole axis a known distance from each other and from the sonic generator(s).

Various types of dipole signal sources and transmitters have been employed or proposed. These include, for example, electromagnetic transducer devices such as is used in Schlumberger's DSI tool (see U.S. Pat. No. 4,862,991 (Hoyle et al.), issued Sep. 5, 1989; U.S. Pat. No. 4,207,961 (Kitsunezaki), issued Jun. 17, 1980; U.S. Pat. No. 4,383,591

(Ogura), issued May 17, 1983); linked mass vibrators driven by magnetostrictive actuators (see, e.g., S. M. Cohick & J. L. Butler, "Rare-Earth Iron 'Square Ring' Dipole Transducer," *J Acoust. Soc. Am.* 72(2) (August 1982), pp. 313–315); piezo-electric bender devices such as are used in the XMAC tool of Baker Atlas (see, e.g., U.S. Pat. No. 4,649,525 (Angona et al.), issued Mar. 10, 1987); magnetic repulsion transducers driving a plate in contact with a fluid in an acoustic wave guide system such as are used in the MPI XACT tool (see, e.g., U.S. Pat. No. 5,852,262 (Gill et al.)); and eccentric orbital masses as proposed in U.S. Pat. No. 4,709,362 (Cole) and U.S. Pat. No. 5,135,072 (Meynier), mainly for seismic uses.

The speeds at which sonic waves travel through underground rock formations are controlled by rock mechanical properties such as density and elastic dynamic constants, and other formation properties such as amount and type of fluid present in the rock, the makeup of the rock grains, and the degree of intergrain cementation. Thus, by measuring the speed of sonic wave propagation in a borehole, it is possible to characterize the mechanical attributes of surrounding formations by parameters relating these properties, which are necessary in efficient and safe development of oil and gas wells. The speed or velocity of a sonic wave is often expressed in terms of I/velocity. Since the acoustic sources and receivers on the tools are separated by a known, fixed length, the difference in time ($\Delta T$) taken for a sonic wave to travel between two points on the tool is directly related to the speed/slowness of the wave in the formation. Thus, surface processing equipment typically determines the speed of a given type of sonic wave by determining the measured travel time between the source and receiver, for various types of acoustic waves. The speed of a given type of wave emitted at a given frequency may then be used to determine formation properties, through suitable processing.

For example, acoustic measurements may be used for: identification of homogenous versus fractured rocks; estimation of rock porosity; identifying oil- versus gas-filled porous formations; identification of near-wellbore invasion of mud fluid in a porous formation; over-pressured regions of the formation; and the presence of large tectonic stresses that can produce radial alteration in the borehole vicinity. Such sonic logging techniques are well known. See, for example, Jay Tittman, *Geophysical Well Logging*, Orlando, Fla.: Academic Press (1986); Illustrated Physical Exploration, Physical Exploration Society (1989); Bikash K. Sinha & Smaine Zeroug, "Geophysical Prospecting Using Sonics and Ultrasonics," in John G. Webster, ed., *Wiley Encyclopedia of Electrical and Electronics Engineering*, New York: John Wiley & Sons, Inc. (1999), pp. 340–365.

Dipole sonic logging tools are sometimes preferred to monopole sonic logging tools, because the former cannot acquire shear $\Delta T$ in formations where the shear slowness is in excess of the fluid compressional slowness (180–200 $\mu$s/ft). Using dipole sonic propagation in the borehole, this physics limitation is removed and shear slowness far in excess of the fluid slowness may be measured. As noted above, a dipole transmitter behaves much like a piston, creating a pressure increase on one side of the borehole and a decrease on the other. This, in turn, causes a small flexing of the borehole, that directly excites compressional and shear waves in the formation. The compressional wave radiates most strongly straight out through the formation, but the shear waves tend to propagate best along the borehole walls. As the shear wave propagates up the borehole, it creates a pressure difference in the borehole fluid that propagates along with it. It is this pressure difference that is detected by the sonic logging tool's directional sonic receivers. Unlike monopole sonic tools, dipole tools can always record a shear wave, regardless of wave speed.

Tagging along behind the dipole shear wave is a flexural wave, which is initiated by the flexing action of the borehole. Flexural waves are typically very dispersive (i.e., their velocity is a function of frequency). Flexural waves are relatively long in duation, since its low-frequency components propagate with the formation shear slowness, i.e. travel at the same speed as the shear slowness waves (but slower than compressional waves). Thus, even though the formation shear and flexural waves run together, the shear can often be detected and, as a result, the formation shear slowness can be determined or estimated directly from both flexural dispersion and actual shear wave measurements. For example, radial variation of shear velocity can be estimated based on measured borehole flexural dispersion. See, for example, U.S. Pat. No. 5,587,966 (Kimball et al.), issued Dec. 24, 1996, describing techniques for deriving borehole information from measured flexural waves.

Historically, dipole logging employing flexural wave measurement has been developed as an alternative to shear wave logging, to be employed in cases where the shear slowness of the formation was so slow that shear head waves could not be generated in the borehole. Flexural wave measurement is based on the fact that the slowness of the flexural wave approaches the shear slowness of the formation.

However, flexural waves are believed to carry richer information than shear waves do. The behavior of flexural waves is sensitive to various mechanical properties of the boreholes. In particular, the dispersion relation of flexural waves implies various useful information such as stress-induced anisotropy. The shear slowness of the formation can be estimated from dispersion curves of measured flexural waves, especially in "slow" formations.

Further, as knowledge of flexural mode propagation increases, flexural logging may be extended to determine other useful information. For example, it may also be used in anisotropic processing, in which a tool, such as a DSI tool, is run in fast formations in order to find anisotropy in the radial plane with respect to the borehole. Such anisotropic processing is used to determine properties of the formation around the borehole which are different depending on the azimuthal direction. For acoustic logging, anisotropy generally appears as a difference in propagation speeds in orthogonal radial planes. Typically, there is a slow-direction plane and a fast-direction plane at 90 degrees to this. This anisotropy can be related to a number of causes, for example, stress in the formation. Such information can be useful, therefore, for example, in designing a fracturing operation to stimulate production from the formation.

It can, therefore, be useful to excite, and detect and analyze, flexural waves. Downhole tools with dipole sources typically transmit sonic waves at a single, fixed firing frequency. However, the sonic frequency of the dipole transmitter may not be optimal for a given formation and borehole at a certain position in the borehole, generating less optimal and thus less useful flexural waves than would be possible were an optimal or ideal sonic frequency and range utilized by the transmitter for a given measurement. One reason for this is that the bandwidth needed for dispersion analysis varies as function of borehole diameter and formation slowness. Thus, for a given formation, if a non-optimal firing frequency is used, optimal flexural wave excitation will not occur. Thus, when detecting and analyzing flexural mode in the received sonic waves, less information will be obtainable than if more energy were to be coupled into the flexural mode waves, i.e. if the flexural waves were more optimally excited by the transmitted sonic waves.

To ensure that the appropriate excitation was provided for a given application, one possible approach would be to provide a wide-band dipole source which generates sonic pulses over a wide range of frequencies, to ensure that the optimal sonic wave frequency, whatever it is, is transmitted. However, this approach would requires an acquisition system having a much larger (and thus more expensive and complicated) dynamic range, and a much higher consumption of power in the generation of such a wide band of signals. Because real-world logging tools have transmitters with limited power and receivers with finite dynamic range, it is often impossible to transmit a sufficiently powerful, wideband signal, and thus a narrower frequency range is employed. In this case, however, if the wrong firing pulse frequency is used for given borehole and formation characteristics, it may not be possible to obtain a useful signal over enough frequency band. Another problem with using a wide-band dipole source is that the resulting sonic waveforms may contain unwanted modes such as dipole compressional waveforms.

Thus, as the potential use of dipole sonic logging increases, there is a need for selecting an optimal sonic dipole firing frequency (source signature) to optimally excite dipole flexural mode waves in the borehole.

SUMMARY

In the present invention, a logging system has a sonde in a borehole, which transmits sonic waves with one or more dipole sources to optimally excite dipole flexural mode sonic waves in the borehole. The system first determines the Airy frequency of the borehole. Then, the dipole sources are fired at a dipole firing frequency selected based on the Airy frequency.

DESCRIPTION OF THE PREFERRED EMBODIMENT

As noted above, it is desirable to excite flexural waves. These waves can then be detected and analyzed to determine information such as its propagating speed, which indicates formation shear slowness. Other information about the borehole and underground formation characteristics can also be determined by analyzing the measured flexural waves. For example, dispersions of orthogonal flexural measurements may be analyzed to determine stress distribution in the formation near the borehole wall. Thus, the speed at which the flexural wave propagates, as well as the variation in this speed around the borehole, and other properties of measured flexural waves, can yield useful information about underground formations around the borehole.

In order to extract such information, a flexural wave of sufficient energy needs to be excited and propagate from source to receivers in the borehole. In an embodiment, it is desired to have a flexural wave having sufficient energy in the frequency band surrounding the Airy frequency of the borehole; in particular, in an embodiment, from half to twice of the Airy frequency of the borehole. This results in good coupling of energy into the flexural mode. Empirical results and theoretical analysis have confirmed that setting the firing frequency to be the Airy frequency of the borehole can optimally excite dipole flexural waves. To fire at a given firing frequency means that the sonic waves emitted by the dipole transmitter have a frequency range or bandwidth around the firing frequency. The firing frequency can be considered to be the "center" frequency of the firing frequency range, e.g. in a linear, logarithmic, or other sense. For example, a firing frequency having a range from half to twice the Airy frequency may be considered to be fired at the Airy frequency.

In the present invention, the dipole transmitters of the logging tool may be fired at a selected one of a number of possible firing frequencies, using corresponding drive or excitation waveforms, instead of repeatedly firing the source at an unchanging, preselected firing frequency or employing a wide-band dipole source. In particular, the dipole transmitter is fired at the firing frequency (over a given frequency range). This firing frequency is one of a plurality of available firing frequencies, which is closest to the Airy frequency of the borehole, or otherwise based on the Airy frequency.

The Airy frequency depends on downhole factors such as the borehole diameter and formation shear slowness. Thus, in the present invention, the Airy frequency is determined or estimated in accordance with any suitable and sufficiently accurate technique, as a function of borehole diameter and formation shear slowness. Then, the dipole transmitters are pulsed with a voltage pulse sufficient to generate a sonic pulse at the Airy frequency. In an embodiment, the sonic pulse has a frequency range from approximately half the Airy frequency to approximately twice the Airy frequency, to provide optimal excitation of flexural waves.

The sonic measurement technique of the present invention yields several advantages. First, instead of a fixed and usually non-optimal firing frequency, the firing frequency may be selected on the fly in accordance with prevailing conditions to result in optimal flexural wave excitation. Second, this technique is energy efficient since it does not require a "shotgun approach" employing a wide range of frequencies. Third, because a single frequency is utilized at a time, the waveforms will not contain unwanted modes such as dipole compressional. Further, field engineers do not have to choose the firing frequency, as this process can be automated with processing and control equipment in the borehole.

In one embodiment, the Airy frequency is estimated, using relevant borehole measurements, by a microcontroller or processor in the tool, in accordance with the method of the present invention. The present invention may employ a processor in the tool itself and/or at the surface, and may be utilized in both an open-hole or cased-hole environment, whether wireline logging or LWD is employed.

Oil Rig System

Figure 1:
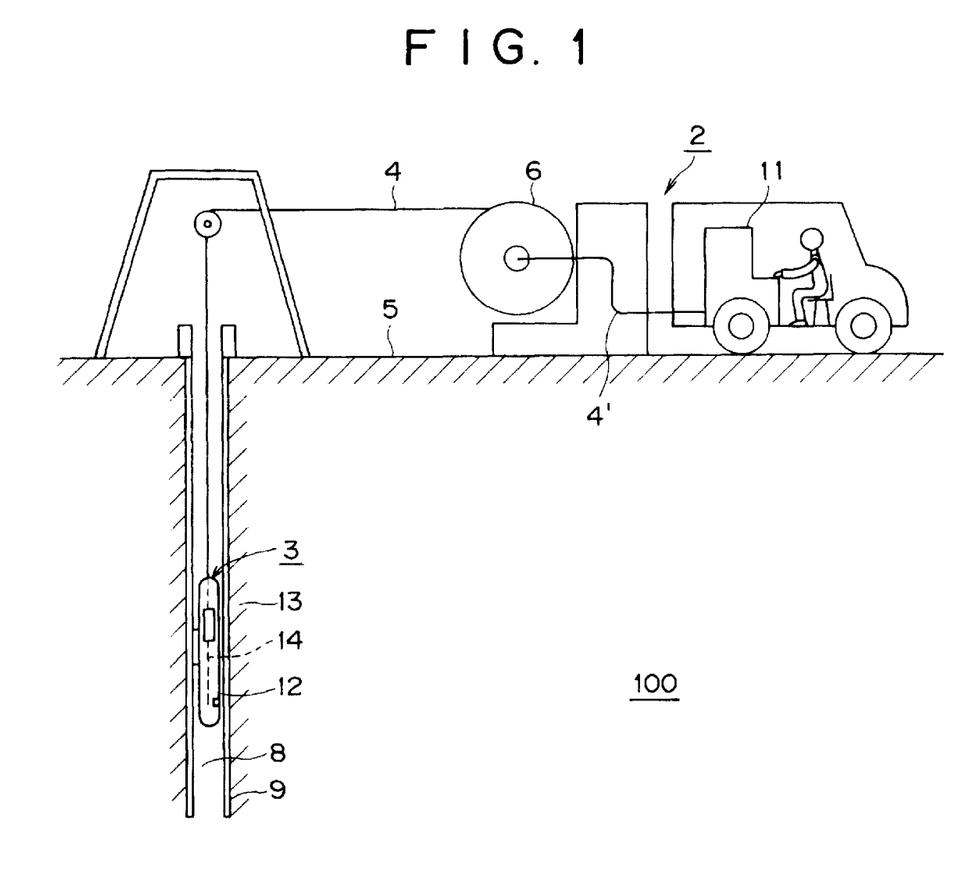
FIG. 1 is a schematic view of a logging system in accordance with an embodiment of the present invention.

Referring now to FIG. 1, there is shown a schematic view of a logging system 100, in accordance with an embodiment of the present invention. A logging system, such as system 100, generally includes ground surface processing apparatus 2 located at the surface 5 near the borehole 8, a sonic logging tool or sonde 3 moveable up and down inside the borehole 8, and a logging cable 4 for mechanical and electrical coupling between the processing apparatus 2 and the tool 3. Borehole 8 has casing or sidewalls 9. The surface apparatus 2 includes a rotatable drum 6 to which one end of the logging cable 4 is connected. The drum 6 is rotated to take up or let out cable 4 so as to move the tool 3 in the borehole 8. The cable 4 is connected via an extension 4' to a computer 11 forming part of the surface apparatus 2.

In an embodiment, as illustrated in FIG. 1, tool 3 is an acoustic logging tool comprising a transmitter section having a pair of (upper and lower) dipole sources 12 arranged orthogonally in the radial plane, and a monopole source (not shown). A sonic isolation joint or spacer section separates and connect connects the transmitter section having dipole transmitters 12 to a receiver section which contains an array of spaced receiver stations 14. The number of receiver stations depends on the particular tool used. Eight stations is common, although twelve or sixteen stations might also be appropriate. Each receiver station contains hydrophones or receivers as sensing elements arranged equally around the circumference of the tool 3. Typically, four hydrophones are provided at each station, although eight are also possible. At each station 14 one opposed pair of hydrophones is oriented in line with one of the dipole sources 12 and another opposed pair with the orthogonal source. An electronics cartridge (not shown) is connected at the top of the tool 3 and allows communication between the tool 3 and the surface apparatus 2 via the cable 4.

Tool 3 also comprises a processor such as microcontroller or microprocessor 13, which is used to control the firing of the monopole and dipole transmitters 12. In use, acoustic signals are generated by the trasmitters 12 and, after propagation through the formation and/or borehole 8, are detected as acoustic pressure waveforms at the hydrophones of the receiver section 14. In an embodiment of the invention, the microprocessor 13 is used to determine the best firing frequency, i.e. a firing frequency based on the Airy frequency, to use in firing dipole transmitters 12 to optimally excite flexural mode waves. Alternatively, a processor in the surface, such as processor 11 of processing apparatus 2, may be used for this purpose.

Whichever processor is used, the processor first estimates the borehole Airy frequency. In an embodiment, the Airy frequency is determined by transmitting, detecting, and analyzing an initial sonic wave, as described below. After the Airy frequency is determined, the processor then selects a firing frequency for the dipole transmitters 12 based on the Airy frequency. The firing frequency is selected so as to cause dipole transmitters 12 to fire a sonic pulse at or near the Airy frequency, so as to optimally excite flexural mode waves. Transmitters 12 are able to transmit sonic waves at a selected one of a plurality of firing frequencies. This may be done by use of a look-up table (LUT), as described in further detail below with reference to FIGS. 10A–D. The Airy frequency is input into the LUT, which then selects the best excitation waveform to use with which to drive the source to achieve an output sonic wave having a frequency range centered as closely as possible to the Airy frequency. In general, an excitation waveform, and thus the generated sonic signal, is selected, based on a calculated Airy frequency.

The resulting optimally excited flexural mode waves are received at receivers 14, and the firing time and received waveforms are transmitted to the surface system 2 for processing in accordance with conventional processing techniques. As will be appreciated, the receivers are hydrophones which measure pressure. The pressure variation over time is the received sonic signal which is output as a waveform from each hydrophone. Thus, each hydrophone of receiver section 14 outputs a varying pressure signal over time, the pressure variations being caused by the arrival of the various modes of acoustic signal that have propagated from the source via the formation and/or borehole.

It should be noted that a waveform detected by receivers of receiver stations 14 will include arrivals from different modes of acoustic propagation, compressional, shear, flexural, dipole, monopole, and so forth. These detected waveforms must be analyzed in some manner to determine which part relates to which mode (which "arrival" is which). In an embodiment, the information output by tool 3 and transmitted to the surface is digital. The signals may be digitized by the tool, or at the hydrophone level. In an alternative embodiment, analog waves can be generated by the hydrophones and transmitted to the surface in analog form.

The measured waveforms measured by the hydrophones are transmitted, in either digital or analog form, to the surface processing apparatus 2 for processing to extract various information. In an alternative embodiment, some or all of the analysis and processing may be performed by processing means in the tool itself instead of at the surface.

Airy Frequency Determination

The purpose of the "optimal" firing caused by using the Airy frequency is to ensure that the transmitted and detected waveforms contain enough energy within the frequency range of interest. Thus, the present invention must determine the Airy frequency. This may then be used to select a transmitter excitation waveform expected to produce the "best" firing frequency range, e.g. the one that most closely matches the frequency range from half to twice the Airy frequency.

In the present invention, the Airy frequency is determined by microprocessor 13 based on the well-known relationship between borehole diameter, Airy frequency, and formation shear slowness, which is given by:

$$Df_A S \approx 0.65 \qquad (1)$$

where D, $f_A$, and S are borehole diameter, Airy frequency, and formation shear slowness, respectively. To compute the Airy frequency $f_A$, therefore, both borehole diameter D and formation shear slowness S must be provided. The borehole diameter is typically known or easily measurable, and thus may be easily provided. The slowness estimation of the flexural arrival, i.e. S, is not known, however. Accordingly, the present invention, in an embodiment, first determines S in order to determined $f_A$. The Airy frequency (or S) may then be used to select the optimal firing frequency of the dipole transmitters, i.e. the firing frequency closest to the Airy frequency and thus the frequency that will optimally excite flexural waves.

In order to estimate $f_A$, four main steps are performed:

1. Detect arrival time of flexural mode in a waveform (such flexural mode information from the waveforms is used to determine the formation shear slowness S);

2. Estimate ΔT from arrival times across an array of receivers 14 (this is the flexural mode ΔT calculated from the flexural arrival time detected in step 1 above, knowing the time of firing of the transmitter and the distance from the transmitter to the receivers);

3. Compute S based on estimated ΔT; compute the Airy frequency of the borehole with input borehole diameter based on S (as shown in Eq. (1), above, the Airy frequency is related to the shear slowness S; thus, because S is related to ΔT, the Airy frequency can be determined based on ΔT); and 4. Choose proper firing waveform according to the computed Airy frequency and operational mode.

Thus, in the present invention, formation shear slowness S is estimated first. Then, the Airy frequency is determined according to Eq. (1), given a known hole diameter D. The shear slowness S can be determined by comparing the arrival time of the flexural wave at each receiver of receiver station 14. For example, assume that we have two receivers distance x apart and the arrival times of the shear wave are t1 and t2 (t1<t2), so that ΔT=(t2−t1). Then, the slowness S can be computed as S=(t2−t1)/x=ΔT/x. (It should be noted that the expression ΔT itself is also sometimes used to refer to slowness S.) Once ΔT is calculated and used to computer slowness S, the Airy frequency $f_A$ can be estimated based on S and D per Eq. (1).

The term "operational mode" as used in step 4 above refers to different measurement configurations for which the purpose of the measurement is different. For example, in a given implementation the bandwidth of the signal may be of no interest, e.g. if the operator wants to acquire low-frequency flexural mode only. In certain cases, the operational mode will be one of a frequency sweep, in which case an "optimum" frequency does not apply. In this case, the operational mode overwrites the frequency selected.

Each of these steps are described in further detail below. As will be appreciated, microprocessor 13 may perform the steps of the present invention to estimate $f_A$ by being suitably programmed with a computer program implementing the steps described herein.

Arrival Time Detection

Figure 2:
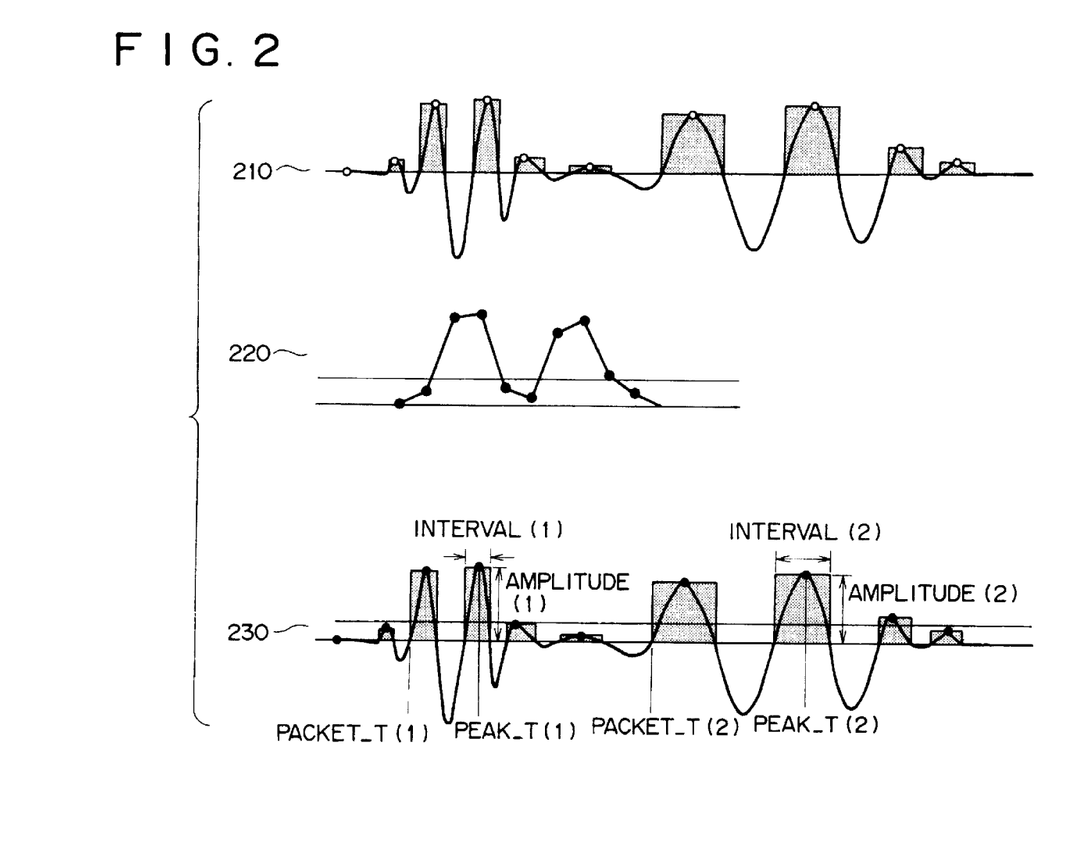
FIG. 2 shows exemplary diagrams illustrating the determination of the arrival time of the flexural component in a dipole waveform from each receiver station of the logging tool of the system of FIG. 1.

The first step is to find the arrival time of the flexural component in a dipole waveform from each receiver station. Referring now to FIG. 2, there are shown diagrams 210, 220, 230 illustrating the determination of such arrival time. This may be done in an initial sonic wave firing, which is made without estimating optimum frequency at the beginning of the logging. The waveform received by a given receiver of receivers 14 is provided to microprocessor 13. The second firing frequency is determined based on the waveforms obtained by the first firing. Further slowness estimation and firing will proceed in the same manner. In an embodiment, a default initial firing frequency is be programmed into the tool, which can be modified by the operator if he feels another frequency will be better to start with.

As shown in diagram 210, the input waveform is "chopped". This is done by scanning the input waveform, and recording the position where the sign of the data changes from negative to positive. After finding the position, microprocessor 13 searches the arrival time and amplitude of the local maximum, and counts the number of the data points until the sign changes again (i.e. measuring half interval). In finding local maxima, a threshold of 20% of the maximum amplitude of the waveform may be employed. In diagram 210, the zero crossings are detected and the local maxima between the crossings determined, i.e. only "positive" data is considered. Thus, each point in the resulting series corresponds to a point in the original waveform. Groups of consecutive points in this resulting series lying over the 20% threshold (or whatever %-threshold is chosen) are considered to relate to one arrival. Thus, in the example shown in FIG. 2, there are two arrivals, as shown by the two respective peaks in diagram 220.

After the first scan, we have an envelope of the input waveform, as shown in illustrative diagram 220, in which the chopped waveforms are grouped into wave-packets.

Four quantities found during the first scan are associated with each point of the envelope, to-wit:

chop_time: The starting time of the positive part.

chop_itvl The interval of the positive part.

chop_tmax: The arrival time of the peak.

chop_xamp: The amplitude of the peak.

Next, microprocessor 13, implementing the algorithm of the present invention, scans the envelope in the same manner as the first scan except that the second scan finds threshold-crossings instead of zero-crosses. After the second scan, as illustrated in diagram 230 we have a few wave-packets and information about each of them as follows:

pckt_time: The index of the first peak in the wave-packet.

pckt_tmax: The index of the maximum peak in the wave-packet. As will be appreciated, the foregoing bolded strings may be uses an variable or parameters in program code implementing the method of the present invention. The points in 220 for given arrivals are mapped back onto the original waveform to locate the peaks in question. These are the "wave-packets" referred to above.

The last step in the arrival time detection is to choose one wave-packet which is the most likely to be the flexural mode. At this stage, some assumptions on the nature of the input waveform are made. It is assumed that the dominant components in the waveform are dipole compressional, flexural, and leaked Stoneley modes. This assumption is made because the dipole transmitters 12 can only generate the waves stated above, whatever frequency it is driven at.

The waveforms shown in FIG. 2 have more than one component and only one flexural component. The goal is to be able to decide which wave-packet relates to the flexural mode. In order to choose the proper flexural component, microprocessor 13 computes the energy (enrgy) for each wave-packet, which is defined as the product of the amplitude of the wave-packet (pckt-xamp) and the interval of the peak (freqs) which has the greatest amplitude in the packet. A large energy means low frequency and/or high amplitude. Thus, as illustrated in diagram 230, the wave-packet with the highest energy may be selected. The flexural arrival is typically of lower frequency than the compressional arrival and so tends to have a higher energy content.

After computing the energy, one wave-packet is chosen. If the previous step can find only one wave-packet, it is chosen as the flexural component. If there are more than two wave-packets in the waveform, the dipole compressional mode can be rejected by comparing the energy of the wave-packets found. Because the dipole compressional mode usually has a much higher frequency component than the flexural mode, the wave-packet with greater energy is chosen, to provide the estimation of the arrival time of the flexural mode. Each wave-packet, i.e. mode, found in the waveform has the arrival time associated with it, which is defined as the beginning time of the wave-packet. Therefore, choosing appropriate wave-packet means choosing one arrival time that is supposed to represent the flexural mode and hence provide the shear slowness.

The term "Stoneley contamination" refers to the phenomenon in which the Stoneley mode leaks into the dipole waveforms. The dipole transmitters 12 may generate the Stoneley mode under some conditions such as tool eccentering even though the Stonely mode is typically associated with monopole signals. The Stoneley contamination is more difficult to resolve. Because the frequency of the Stoneley mode is lower than the flexural mode and their amplitudes are sometimes comparable, the energy of the Stoneley mode can be greater than the flexural arrival. Therefore, taking the wave-packet with maximum is not appropriate in case of Stoloneley contamination. That is, the above-described method (taking wave-packet with maximum amplitude) cannot distinguish a flexural wave-packet from Stoneley wave-packet. Thus, In order to handle Stoneley contamination appropriately, the highest and the second energy are compared. If the highest energy is much greater than the second one, the wave-packet with maximum energy is chosen as the flexural. Otherwise, the wave-packet which arrives earlier is chosen. In one embodiment, a parameter weight is introduced to define the threshold to separate above two cases. After the computation above, following are obtained:

peak_Ts: The arrival time of the chosen wave-packet.

packet_Ts: The arrival time of the peak in the packet.

intervals: The interval of the largest peak in the packet.

ΔT Estimation

The arrival time detection step described above is applied for each dipole waveform in an array of waveforms detected by the array of receivers. As described above, this array of waveforms are waveforms obtained by the previous firing, i.e the waveforms from each receiver station 14 for a given firing. Two kinds of arrival time are computed for each waveform: the beginning of the wave-packet (packet_Ts) and the arrival time of the peak in the wave-packet (peak_Ts). Using only the peak arrival time in wave-packets is not sufficient to determine the arrival time of the wave-packet since the position of the peak in the flexural wave-packet tends to move as the wave propagates because of dispersion. In such a case, the beginning time of the wave-packet gives a better estimation of the arrival time of the wave-packet.

In the ΔT estimation, the arrival times computed for each waveform in the array are assembled together and a statistical process is applied thereto. The process is applied to both sets of the arrival times in parallel. First, differences of the arrival times between adjacent receivers are computed (peak_dts and pckt_dTs). Then, the median value of the differences are taken as the estimation of the arrival time difference (peak_dT and pckt_dT).

Next QC, a quality indicator of the ΔT estimation, is computed. It is defined as the number of samples which are within a particular tolerance with respect to the median value. QC indicates how consistent the arrival time differences across the array are, and it can be used as a quality control parameter of the slowness estimation.

At this point, two different ΔTs and the associated QCs have been computed or estimated, as described above. Then, the estimated ΔT which yields the greater QC is chosen. This provides the following variables, in the code implementing an embodiment of the present invention:

deltaT: The estimated arrival time difference between adjacent receivers.

interval: The half-interval of the dominant frequency components in the chosen wave-packet.

qc: The parameter showing the quality of the estimation.

Firing Frequency Selection

The Airy frequency of the borehole, $f_A$, can be computed as a function of the estimated ΔT, as:

$$f_A = (0.65 \cdot dz)/(D \cdot \Delta T \cdot dt) \quad (2)$$

where D, dt, and dz represent borehole diameter, sampling interval, and axial receiver spacing, respectively. Also, $f_x$, the dominant frequency in the chosen wave-packet (fx) can be computed as:

$$f_x = 1/(2\tau dt) \quad (3)$$

where τ is the half interval of the dominant frequency component in the waveforms (interval).

In an embodiment, before finding the proper firing frequency, the quality of the estimation is checked using QC, $f_x$, and $f_A$. First, QC is checked to see whether it satisfies the following condition:

$$QC \geq [(N-1)/2] \quad (4)$$

where m=(N−1)/2; [m] is the maximum integer not greater than m, and N is the number of waveforms. For example, for an eight receiver station array (N=8), m=3.5 and [m]=3. If QC≧3 then the condition of inequality (4) is satisfied. If the condition of inequality (4) is satisfied, the method of the present invention recognizes that the slowness estimation is reliable.

However, there is one case in which we cannot rely on the estimation, even if the QC is large enough: when the waveforms only have very clear and strong compressional arrival. In such a case the algorithm "honestly" finds the slowness of the compressional mode. When the waveforms have compressional arrival only, the algorithm described above cannot distinguish the situation such that the waveforms have compressional component only and the situation such that the waveforms have flexural component only.

Therefore, in an embodiment, the algorithm described above is modified so that it can distinguish the above two situations from each other. This modification is described as follows: In order to help identify the compressional arrival, the ratio of $f_x$ with respect to $f_A$ is computed. As shown in above equations, $f_x$ is the dominant frequency of the chosen arrival and $f_A$ is the expected dominant frequency when the chosen arrival is flexural wave. The ratio $f_x/f_A$ has a greater value when the frequency component in the observed waveform is much higher than the frequency expected from the slowness and borehole diameter. Therefore, microprocessor 13, implementing the algorithm of the present invention, can determine that the estimated slowness is not for flexural but for dipole compressional if the ratio $f_x/f_A$ is greater than a particular value, which should be given as a threshold parameter (comp_flex).

If these quality checks are passed, the firing waveform is chosen using a look-up table (LUT), as described below. Otherwise, if these quality checks are not passed, the firing waveform used for the previous firing are used until a reliable estimate can be obtained, where the successive number of unreliable estimations is not greater than some threshold integer N. If the poor quality estimation lasts more than N firings, a default firing frequency is used.

Empirical Results

Empirical results obtained for an embodiment of the slowness estimation algorithm of the present invention are described below with reference to FIGS. 3–8, which illustrate exemplary waveforms of sonic signals received at the array of sonic receivers 14, which are spaced from each other along the length of the sonic tool 3 of FIG. 1 and which are received from transmitters 12 of tool 3. The initial (leftmost) short, dark vertical bars in each waveform represent the beginning of the chosen wave-packet, while the second such bar in each waveform represents the arrival time of the peak in the selected wave-packet.

Figure 3:
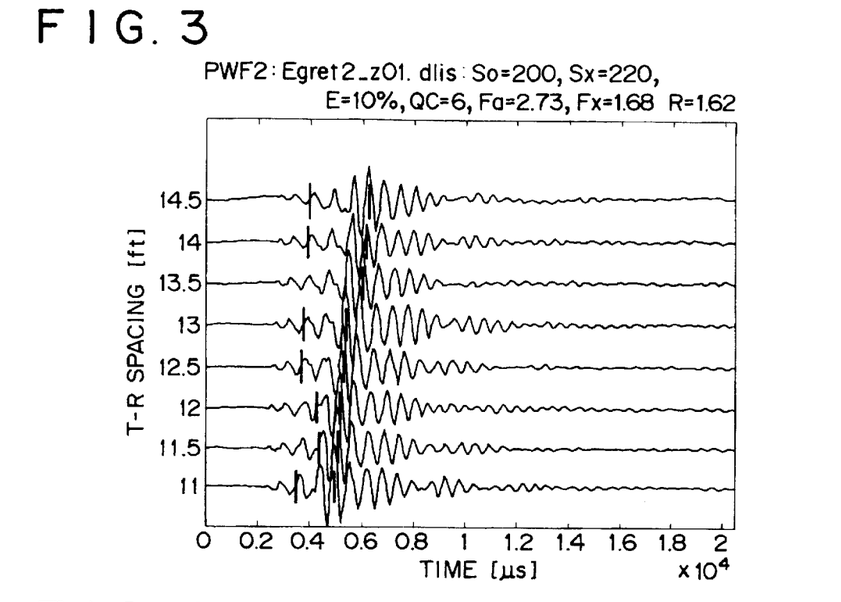
FIGS. 3–8 illustrate exemplary waveforms of sonic signals received at an array of sonic receivers spaced from each other along the length of the sonic tool of FIG. 1 and from a transmitter of the same tool.

Referring now to FIG. 3, there is shown an example from a medium-fast formation. It can be seen that there is only one wave-packet in each waveform and the beginning times are not aligned well. This can happen when the separation of the dipole compressional and flexural waves is not sufficient, and the magnitude of the compressional mode is slightly smaller than the flexural mode. On the other hand, the peak arrivals in this result are aligned well. In this example, the algorithm of the present invention takes the peak arrivals as the estimation of the arrival time.

Figure 4:
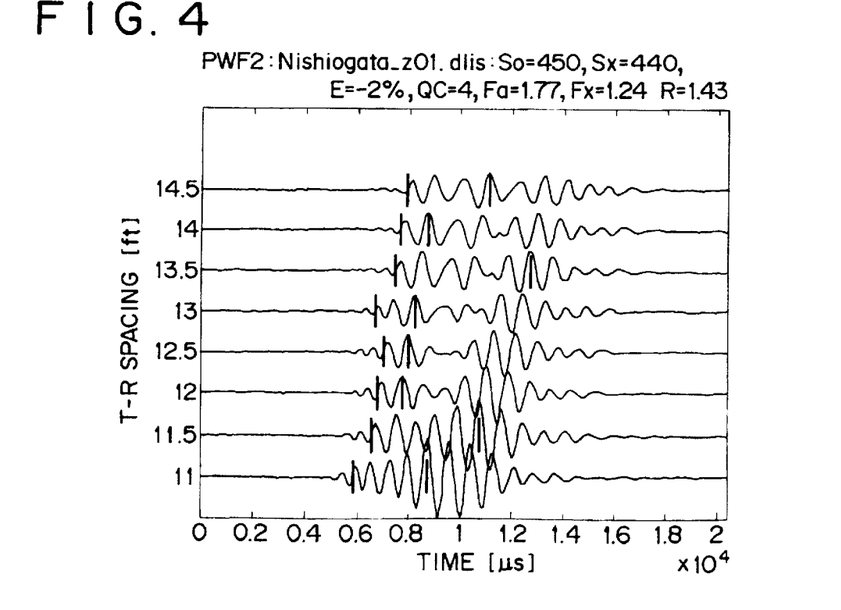

Referring now to FIG. 4, there is shown a series of waveforms illustrating how the method of the present invention handles Stoneley contamination. Because of such contamination, there can be found two wave-packets in the third, fourth, and fifth waveforms, probably due to the Stoneley mode leaked into the dipole measurement. The algorithm compares the energy of the first and the second wave-packet, and then chooses the earlier arrival since the energies of these packets are comparable. Because the other waveforms have only one packet, the arrival time of the peak varies substantially. Therefore, the beginning times of the packets are better estimate in this case.

Figure 5:
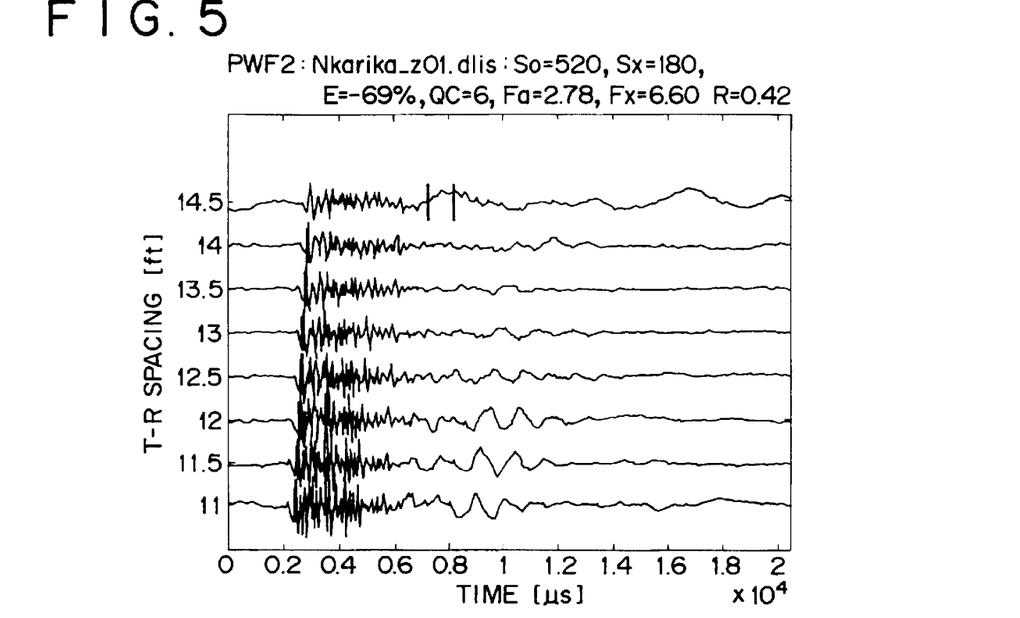

Referring now to FIG. 5, there is shown a series of waveforms resulting in a slow formation. This example illustrates the risks involved in making such estimations as are made herein. It can be seen that there are strong dipole compressional arrival in the waveforms, and the flexural mode is smaller than that. The algorithm described above recognizes the compressional arrival as the flexural arrival. Even worse, the quality control parameter (erroneously) shows that the estimation is reliable. Such a case is thus difficult to handle automatically. In some case, the result from such waveforms can be rejected by comparing the estimated frequency and the dominant frequency in the chosen wave-packet.

Figure 6:
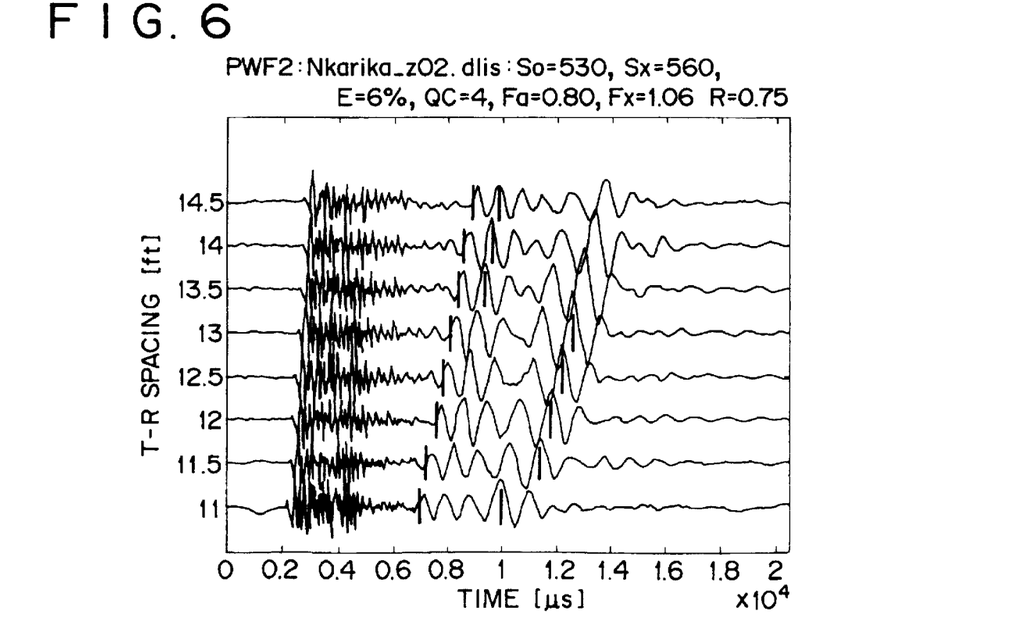

Referring now to FIG. 6, there is shown a series of waveforms resulting from the same well and borehole as for the waveforms in FIG. 5. The waveforms in this example contain all three modes (dipole compressional, dipole flexural, leaked Stoneley), which can be handled by the algorithm of the present invention. It can be seen that the algorithm finds two wave-packets in the waveform from the first to the fifth receiver, while it finds three wave-packets in other waveforms. The reason for such difference is that the separation between Stoneley and flexural waveforms increases as the wave propagates further along the borehole. In this case, the algorithm of the present invention chooses the appropriate arrival time. The arrival time which is estimated is the arrival time of the flexural component in the waveforms. This estimated arrival time is used to estimate the slowness S of the flexural wave, as described above, which can be used to estimate the Airy frequency.

Thus, in the present invention, the optimal sonic dipole firing frequency is determined which will optimally excite dipole flexural mode waves in the borehole. This is done by setting the firing frequency as close as possible to the Airy frequency for the borehole. The sonic waves detected by the receivers will thus include the flexural mode, which can be analyzed at the surface to extract information about characteristics of the formations. As described above, various characteristics of the flexural mode waves can be analyzed to determine formation and borehole characteristics such as formation shear slowness and stress distribution in the formation near the borehole wall.

To provide a flexural wave having sufficient energy to do this, the sonic transmitters are fired at a firing frequency centered as closely as possible on the Airy frequency of the borehole, and, in particular, with a frequency range covering half to twice the Airy frequency at sufficient energy, in an embodiment. To determine the Airy frequency, an initial sonic wave is fired, and then analyzed as described above e.g., receiving these initial sonic waves and determining the slowness S) to estimate the Airy frequency.

The Airy frequency itself is determined or estimated by the following steps. First, the arrival times of flexural mode for an array of received waves is determined. This may be the result of an initial firing designed to estimate the slowness S and thus the Airy frequency. The arrival times of flexural mode is determined by choosing the wave-packets which are the most likely to be the flexural mode, which is itself done by comparing the energy of wave-packets and related computations described in further detail above. Arrival times are then estimated for the selected wave-packets based on both the beginning of the wave-packet and the arrival time of the peak in the wave-packet. $\Delta T$ is then measured using both types of arrival times. The better "quality" $\Delta T$ is then selected, based on which produces the highest QS. Because slowness S is related to $\Delta T$, and the Airy frequency is related to slowness S (for a given borehole diameter), the Airy frequency of the borehole, $f_A$, is computed as a function of the estimated $\Delta T$. This may or may not involve actually computing S as an intermediate step; i.e., $f_A$, may be determined directly from $\Delta T$, or from S, which is itself determined from $\Delta T$. (The quality of the estimation of arrival time used may be checked using $f_x$, the dominant frequency in the chosen wave-packet, as described above.)

Once the Airy frequency is determined, a LUT is used to determine the best of the available firing waveforms to use to achieve the desired a firing frequency as close as possible to the Airy frequency. In an embodiment, as described in further detail below in the section entitled "Firing Waveforms," this is done by inputting the Airy frequency into a LUT to select one of a plurality of pre-programmed excitation waveforms. Alternatively, instead of actually computing Airy frequency, the slowness S or $\Delta T$ factors can be used as inputs to a LUT to determine the source waveform. In either embodiment, the transmitters have an excitation waveform applied thereto, and fire at a given firing frequency (and range), which is selected in accordance with, or based on, the computed Airy frequency of the borehole.

Figure 7:
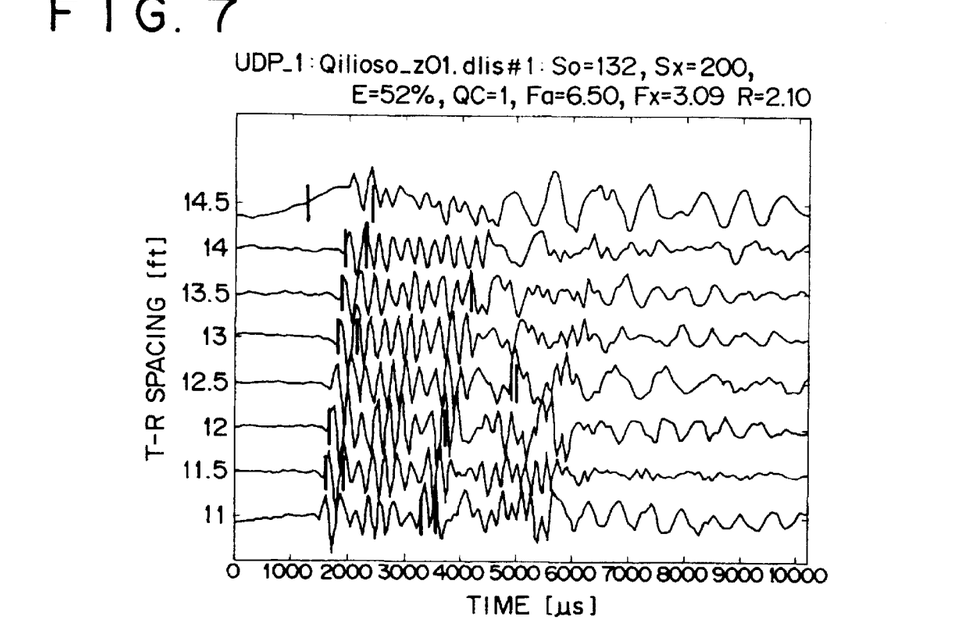
Figure 8:
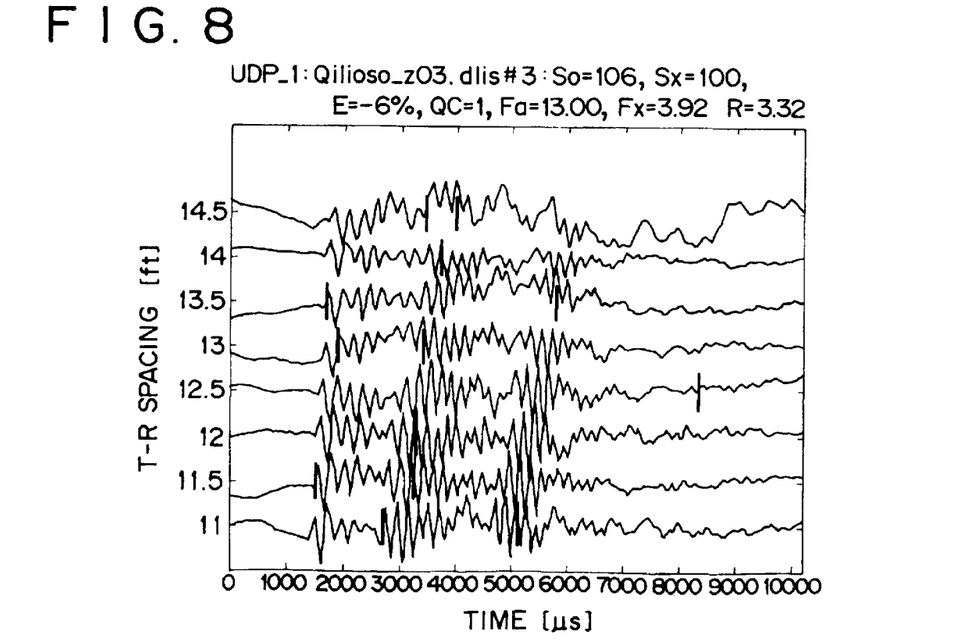

FIGS. 7–8 each show a series of poor-quality waveforms and processing results. These are considered to be poor-quality waveforms for purposes of determining the appropriate arrival time of the flexural waves because the waveforms contain many unknown modes. The present invention is unable to find consistent arrival times in such waveforms.

Empirical testing showed that the slowness estimation algorithm of the present invention generally works well, for most tested waveforms. Although the success rate for some waveforms is poor, the quality control parameter can still, in some cases, show that the estimation is not reliable. For other waveforms, however, which have too much noise such as unknown arrivals, reflection from bed boundary, baseline drift, and the like, it is difficult to produce good results with an automatic algorithm. One reason for poor waveform quality, may be refocused excitation of the flexural mode. The Airy frequency of the borehole in one exemplary well borehole, for example, was found to be around 6.5 kHz, while the frequency of the source is much lower than that. In such an environment, a better-focused excitation of the borehole flexural mode waves should increase the signalto-noise ratio in the waveform, thereby improving the performance of the method described herein.

Firing Waveforms

Figure 9:
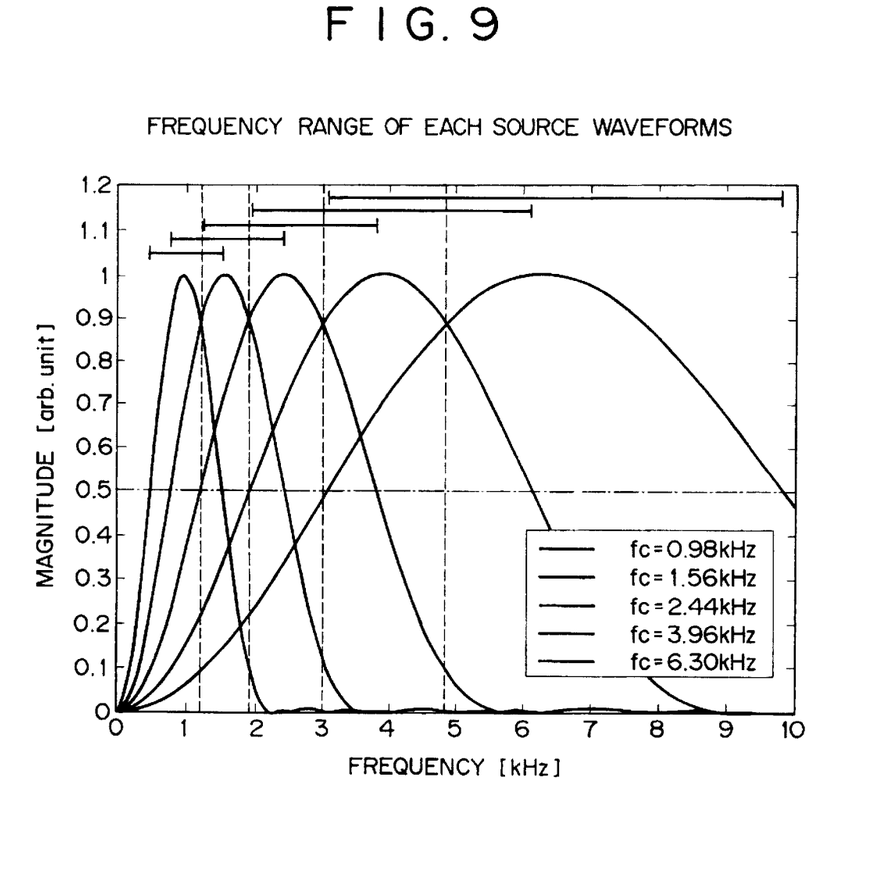
FIG. 9 is a plot of the magnitude versus frequency of a plurality of selectable source waveforms provided by the dipole transmitters of the sonic tool of FIG. 1, each having different firing frequencies and frequency ranges.

As noted above, tool 3 is preferably provided with the ability to selectively fire at one of a predetermined plurality of firing frequencies, each having an accompanying frequency range or bandwidth. This firing frequency is based on the Airy frequency, and is preferably as close as possible to the Airy frequency in an embodiment. Referring now to FIG. 9, there is shown a plot of the magnitude versus frequency of a plurality of selectable source waveforms provided by the dipole transmitters 12 of sonic tool 3, each having a different firing frequency and frequency range. Each sonic source waveform is caused by a particular excitation waveform applied to the source transmitters.

In this selection of firing frequencies, the firing frequencies are determined as the first derivative of the Blackman-Harris window with various center frequencies. The y-axis represents the normalized magnitude of the spectra of the source, and the x-axis is frequency in kHz. The horizontal bars drawn at the top of the figure show the frequency band covered by the corresponding source. The frequency band "covered" refers to the frequency band at which the transmitted signal has 50% of its peak amplitude (−6 dB).

Other source waveform selections may be made, in accordance with implementation and application needs, taking into account the following factors:

the maximum length of the firing sequence waveform shape;

a frequency band which should be covered with one source signature;

relationship between the estimation error and loss of the excitation energy; and data processing requirements.

Figure 10A:
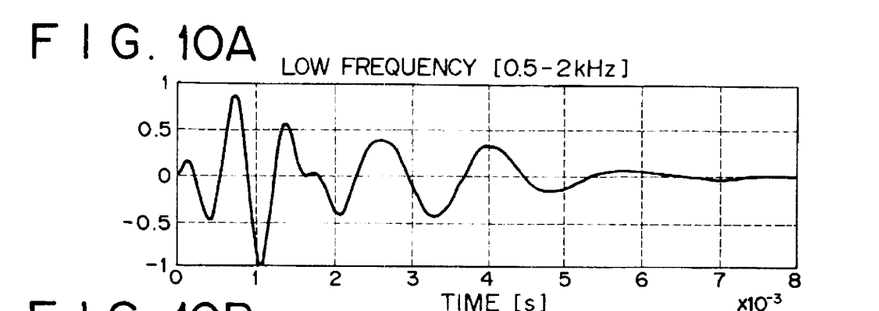
FIGS. 10A–C are plots of illustrative excitation waveforms used to drive a sonic transducer.
Figure 10B:
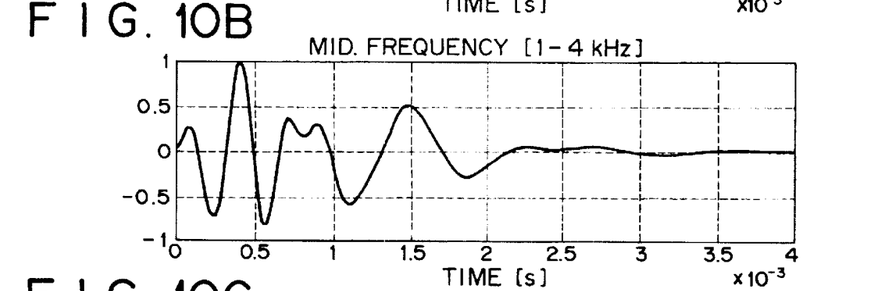
Figure 10C:
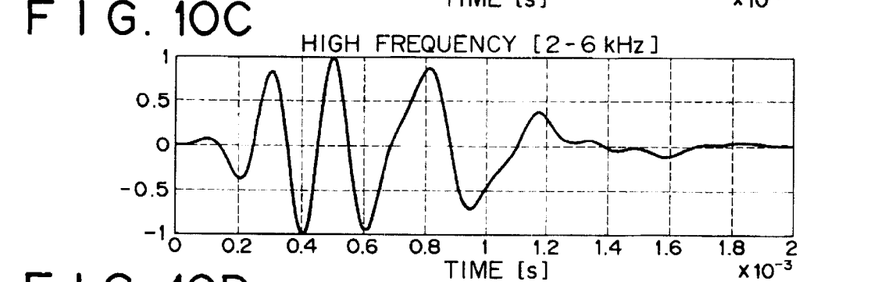
Figure 10D:
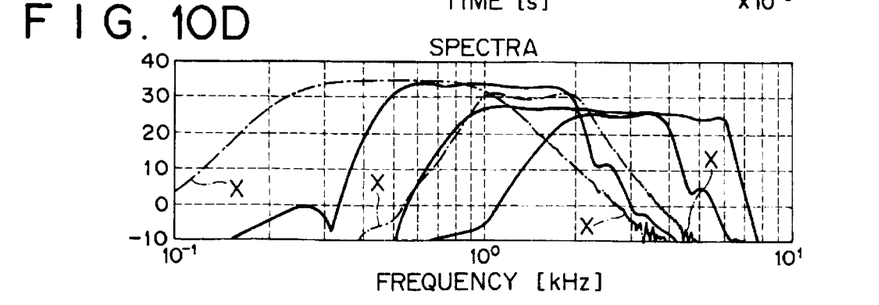
FIG. 10D is a plot of the frequency spectra of the sonic waveforms generated by the excitation waveforms of FIGS. 10A–C, respectively.

Referring now to FIGS. 10A–C, there are shown plots of illustrative excitation waveforms used to drive a sonic transducer such as the sonic dipole transmitters 12. FIGS. 10A–C show plots of excitation waveforms (versus time) used to cause a low-frequency, mid-frequency, and high-frequency sonic waveform, respectively. FIG. 10D shows the frequency spectra, in curves 1001, 1002, and 1003, of the sonic waveforms generated by the excitation waveforms of FIGS. 10A–C, respectively. In FIG. 10D, the waveforms marked X are for a conventional type of source and are shown for comparison. The horizontal axis shows a frequency range from 100 Hz to 10 kHz, in a logarithmic scale.

Transmitters 12 are able to transmit sonic waves at a selected one of a plurality of firing frequencies caused by corresponding drive or excitation waveforms, which drive the piezoelectric source. In an embodiment, the LUT describes several types of source signature and the associated frequency band. The waveforms shown in FIGS. 10A–C represent the current which is applied to an op-amp which drives the source transducer by outputting a voltage with the same wave shape and timing. The shape of the input wave is chosen to match the acoustic characteristics of the source transducer and tool to give the desired acoustic output. As can be seen, in an embodiment, the pulse length varies from 0.002 to 0.008 seconds. Such pulses might be repeated twice per second or so. The LUT stores these waveforms and applies them to the source drive when called from memory.

In an embodiment, several excitation waveforms are prepared, each of which causes the sonic transmitters to fire sonic waves at a certain frequency range. These excitation waveforms are stored in the downhole memory as digital sequences. Then, one of them is chosen by the LUT routine with determined Airy frequency. Thus, the input to the LUT is the Airy frequency (a number), and the output of the LUT is also a number, i.e. the identification or index number of the waveform. In an embodiment, the chosen digital sequence is provided to a digital-to-analog converter and converted to an analog voltage signal. This analog excitation signal is sent to an amplifier which provide current that is proportional to the voltage input to the transmitter.

For example, assume that three firing waveforms are prepared such that waveform #1 covers from 0.5 kHz to 2 kHz, waveform #2 covers 1 kHz to 4 kHz, and waveform #3 covers 2 kHz to 8 kHz. Each of these three firing waveforms is caused by driving the transmitters with a corresponding excitation waveform designed to cause the transmitter to have a certain firing frequency and range. If the Airy frequency is determined to be 1.8 kHz, waveform #2 might be selected as a result of the number 1.8 k being input into the LUT (because 1 kHz is close to half of 1.8 kHz, and 4 kHz is roughly twice 1.8 kHz). In general, an excitation waveform, and thus the generated sonic signal and its firing frequency and frequency range, is selected, based on a calculated Airy frequency.

As will be appreciated, the output sonic firing frequency and range can also depend on the type of source, e.g. some transmitter types are inherently while some are inherently narrow-band. Not all sources can be made to output all frequencies. Also, because the drive or excitation waveforms are not just simple AC input signals but must be shaped to optimize the output depending on frequency, discrete waveforms are used and the one which provides the "best" firing waveform, for a given Airy frequency, is selected.

In an alternative embodiment, a very large number of drive waveforms and corresponding firing frequencies may be provided so that any Airy frequency can be very closely matched. In yet another embodiment, a source signature model could be used which generates a new drive waveform, for a given Airy frequency, which drive waveform will cause a firing frequency very close to the desired Airy frequency range of half to twice the Airy frequency.

Thus, once the Airy frequency is determined, the algorithm inputs the Airy frequency into the LUT to find the source of which frequency band covers this Airy frequency. In an embodiment, the LUT is programmed into the tool 3 with a set of descriptions for different dipole source firing waveforms. These can be pulses of different frequency, frequency sweeps, etc. Thus the tool 3 is able to select from a set of pre-defined firing waveforms to try to get as close as possible to the desired Airy firing frequency. Frequency sweeps may be used to cause transducer to start at one frequency (low) and increase the frequency of the signal throughout the pulse to end at another (high). Some formations might respond better this than a single frequency signal for certain types of measurement. Sweep waveforms may also be provided in the LUT but are not triggered by calculating the Airy frequency.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a logging system having a sonde in a borehole, a method for transmitting sonic waves with one or more dipole sources of the sonde to optimally excite dipole flexural mode sonic waves in the borehole, the method comprising the steps of:

(a) determining the Airy frequency of the borehole; and (b) firing said dipole sources at a dipole firing frequency selected based on the Airy frequency.

2. The method of claim 1, wherein the dipole sources are fired at the dipole firing frequency over a frequency range, wherein the dipole firing frequency and frequency range are selected to be as close as possible to a firing frequency range from half to twice the Airy frequency.

3. The method of claim 1, further comprising the step of:

(c) receiving said transmitted sonic waves with an array of sonic receivers.

4. The method of claim 3, further comprising the step of:

(d) determining physical properties of underground formations around said borehole based on said sonic waveform measurements.

5. The method of claim 1, wherein step (a) comprises the steps of:

(1) transmitting initial sonic waves with said dipole sources at an initial firing frequency;

(2) receiving said initial sonic waves with an array of sonic receivers; and (3) determining the Airy frequency of the borehole based on said received initial sonic waves.

6. The method of claim 5, wherein step (a)(3) comprises the step of determining the Airy frequency with a processor located in the sonde in the borehole.

7. The method of claim 5, wherein step (a)(3) comprises the steps of: transmitting to a processor at the surface said received sonic wave information and determining, with the processor, the Airy frequency.

8. The method of claim 5, wherein step (a)(3) comprises the steps of: determining the flexural arrival time of the flexural mode of the initial sonic waves, determining the shear slowness based on the flexural arrival time, and determining the Airy frequency based on the shear slowness and the diameter of the borehole.

9. The method of claim 1, wherein step (b) comprises the steps of:

inputting the Airy frequency into a look-up table (LUT); and receiving from the LUT, in response to the input Airy frequency, an output index for selecting a selected one of a plurality of excitation waveforms corresponding to a selected dipole firing frequency having a frequency range.

10. The method of claim 1, wherein said one or more dipole sources consist of a pair of dipole sources.

11. A sonic logging system for measuring physical properties of underground formations around a borehole, comprising:

(a) a processor for determining the Airy frequency of the borehole; and (b) a sonde having one or more dipole sources for transmitting sonic waves in the borehole at a selected one of a plurality of dipole firing frequencies, wherein the selected dipole firing frequency is selected based on the Airy frequency.

12. The system of claim 11, wherein the sonde fires the dipole sources at the dipole firing frequency over a frequency range, wherein the dipole firing frequency and frequency range are selected to be as close as possible to a firing frequency range from half to twice the Airy frequency.

13. The system of claim 11, the sonde comprising an array of sonic receivers for receiving said transmitted sonic waves.

14. The system of claim 13, further comprising a processor for determining physical properties of underground formations around said borehole based on said sonic waveform measurements.

15. The system of claim 11, further comprising:

means for transmitting initial sonic waves with said dipole sources at an initial firing frequency;

an array of sonic receivers for receiving said initial sonic waves; and a processor located in the sonde for determining the Airy frequency of the borehole based on said received initial sonic waves.

16. The system of claim 15, wherein the processor determines the Airy frequency by: determining the flexural arrival time of the flexural mode of the initial sonic waves, determining the shear slowness based on the flexural arrival time, and determining the Airy frequency based on the shear slowness and the diameter of the borehole.

17. The system of claim 11, further comprising:

a look-up table (LUT) for receiving the Airy frequency as an input and for providing, in response to the input Airy frequency, an output index for selecting a selected one of a plurality of excitation waveforms corresponding to a selected dipole firing frequency having a frequency range.

18. The system of claim 11, wherein said one or more dipole sources consist of a pair of dipole sources.

19. A sonde for transmitting sonic waves to optimally excite dipole flexural mode sonic waves in a borehole, the sonde comprising:

(a) a processor for determining the Airy frequency of the borehole; and (b) one or more dipole sources for transmitting sonic waves in the borehole at a selected one of a plurality of dipole firing frequencies, wherein the selected dipole firing frequency is selected based on the Airy frequency.

20. A borehole logging method comprising the steps of deploying into a borehole an acoustic logging tool comprising at least one dipole source and a receiver section containing an array of receiver stations;

generating an initial acoustic signal with said at least one dipole source;

receiving said initial acoustic signal at said receiver stations;

analyzing said received signal to determine the Airy frequency, wherein such analysis comprises detecting the arrival time of the flexural wave, estimating the difference in time of the arrival across said array of receiver stations, calculating slowness based on the estimated time difference, calculating the Airy frequency using said slowness; and choosing a waveform according to said computed Airy frequency;

generating an acoustic signal employing said chosen waveform using said at least one dipole source; and receiving said acoustic signal at said receiver stations.

* * * * *